Patented Jan. 10, 1939

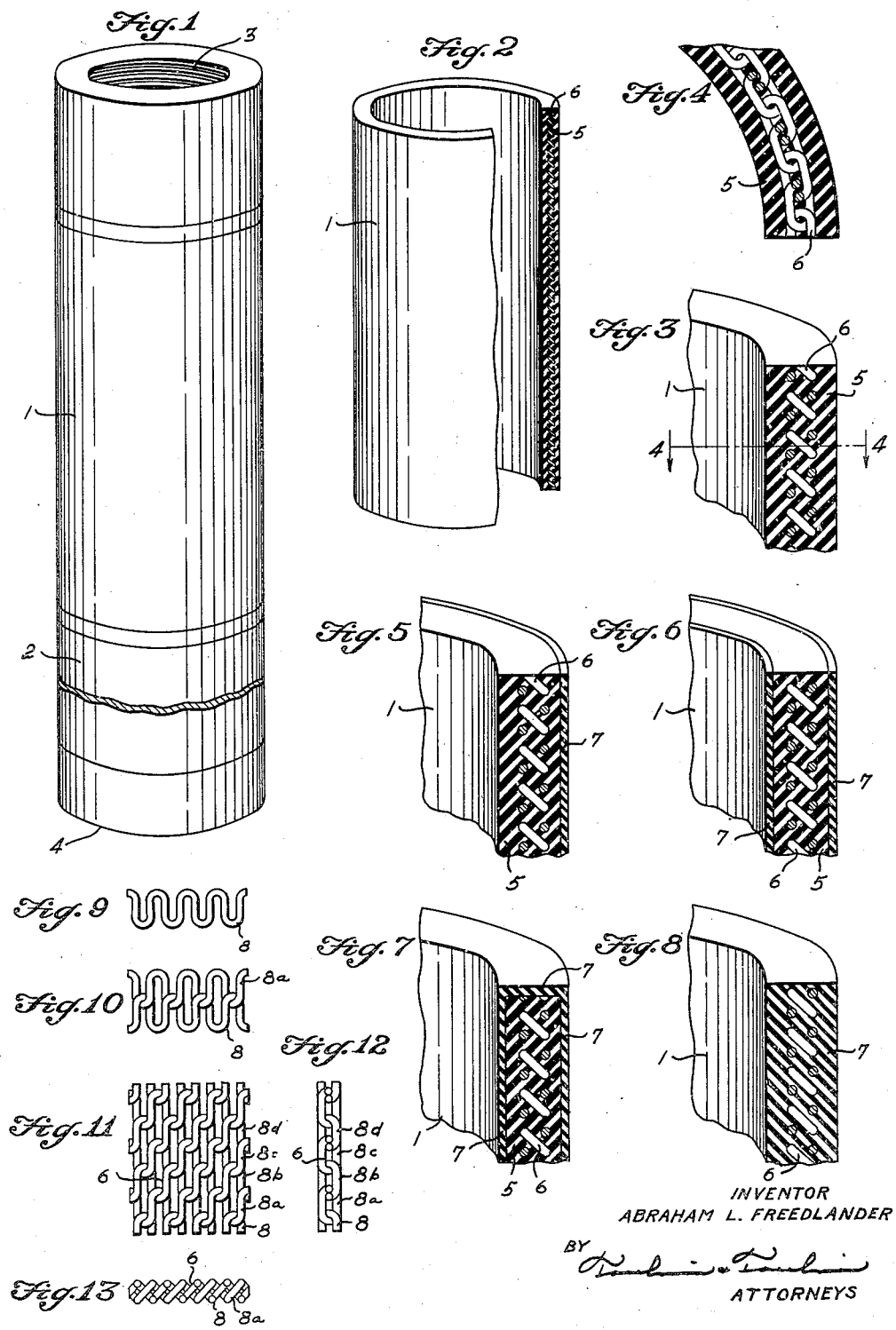

2,143,106

UNITED STATES PATENT OFFICE 2,143,106

OIL PACKER

Abraham L. Freedlander, Dayton, Ohio, assignor to The Dayton Rubber Manufacturing Company, Dayton, Ohio, a corporation of Ohio Application March 8, 1937, Serial No. 129,627

6 Claims. (Cl. 166—10)

This invention relates to oil packers and particularly to resilient sleeves therefor. These sleeves are known in the art at packer rubbers.

It is an object of this invention to provide a reinforced construction of oil packer sleeve.

It is a further object of this invention to provide such a sleeve constructed of rubber reinforced with longitudinally inextensible flexible metal mesh.

It is a further object of this invention to provide such a sleeve which is provided with a coating of oil resistant material.

It is a further object of this invention to provide such a construction wherein the body of the sleeve is formed of oil resistant synthetic rubber reinforced with flexible metal mesh.

It is a further object of this invention to provide a sleeve construction formed of a body of oil resistant synthetic rubber having imbedded therein a reinforcement of rubber impregnated flexible metal mesh.

It is a further object of this invention to provide in a resilient sleeve construction for use in oil packers, means of reinforcement for the resilient body material which will provide additional strength without reduction of the resiliency of the body material.

It is a further object of this invention to provide such reinforcement as will materially increase the life and/or permanency of the packer with which the resilient sleeve is used.

It is a further object of this invention to provide, for use with oil packers, a resilient sleeve which possesses the desired resiliency and other properties of rubber and which possesses, in addition, a much higher degree of resistance to cold flow and to the attack of oil, gas, and other materials to which rubber is highly vulnerable.

These and other objects and advantages will appear from the following description taken in connection with the drawing.

In the drawing:

Figure 1 is a perspective view of a mechanical packer of the type known as a casing anchor packer and provided with a resilient sleeve constructed according to the principles of this invention;

Figure 2 is a view, in perspective, partially broken away, of the packer sleeve illustrated in Figure 1;

Figure 3 is an enlarged fragmentary view of the sleeve illustrated in Figure 2;

Figure 4 is a section of the fragment illustrated in Figure 3, taken along the line 4—4 of Figure 3;

Figure 5 is a view similar to Figure 3, of a modified sleeve construction;

Figure 6 is a view similar to Figure 5, of a second modified sleeve construction;

Figure 7 is a view similar to Figure 5, of a third modified sleeve construction;

Figure 8 is a view similar to Figure 5, of a fourth modified sleeve construction;

Figure 9 is a plan view of a metallic strand, of which the longitudinally inextensible metal mesh is formed;

Figure 10 is a view similar to Figure 9, but showing the interengagement of a pair of strands in the preferred form of mesh;

Figure 11 is a plan view of an area of the metal mesh;

Figure 12 is a side view of the mesh shown in Figure 11; and

Figure 13 is an end view of the mesh illustrated in Figure 11.

Oil packers are of various types, both mechanical and otherwise, although this invention relates primarily to mechanical oil packers of the type designed to expand a resilient cylinder or sleeve against the walls of the well for the purpose of excluding water and/or gas, either above, below or both above and below oil bearing sands in the drilling of oil wells. Due to the materials of which these packer sleeves, or "rubbers" were formerly constructed, the packers were not regarded as permanent in the sense that they function effectively throughout the life of the well. This was an extremely undesirable feature of the use of mechanical packers because the permanent exclusion of water was necessary, as oil production was contingent upon it.

Mechanical packers are lowered and manipulated on either the casing or tube of the well and may be used to seal off the space between two strings of pipe, or between the pipe and the walls of the well.

All mechanical packers operate by expanding a hollow cylinder of rubber, lead, canvas or burlap at the desired point in the well, either by compression from the ends, against a tapered metal sleeve, or by rotation of screw devices. Mechanical packers are of various types such as bottom hole packers, disk wall packers, hook wall packers, disk anchor packers, screw anchor packers, etc.

One of the disadvantages of the prior use of rubber in the construction of such packer sleeves was the vulnerability of the rubber to cold flow under the continued application of extremely high pressures thereto after the setting of the sleeves in the well casing or walls of the well hole.

A further disadvantage was the extreme vulnerability of rubber to the attack of oil, gas and other materials encountered in the use of the oil packers.

By the practice of the principles of this invention, I have produced a sleeve for mechanical packers, which is possessed of extreme resistance to the attack of oils, gases and the like, and which, in addition, is highly resistant to cold flow upon the application thereto of continued pressure. This latter advantage makes possible the successful reuse of mechanical packers without replacement of the rubbers or packing sleeves necessary in the prior art due to the substantially universal destruction of these rubbers or sleeves upon removal of the packer after the setting thereof in the casing or wall of an oil well.

The reinforcing of resilient bodies of rubber and/or synthetic rubber was heretofore sought to be accomplished by the incorporation therein of somewhat flexible reinforcing members of fabric, metal and other materials having continuous surfaces unprovided with interstices or apertures capable of permitting the extension therethrough of sufficient rubber or synthetic rubber resiliently to connect together the portions of the resilient body at opposite sides of the reinforcement. The resiliency of the body was, therefore, substantially impaired by the incorporation therein of such reinforcement.

While, in some cases, the reinforcing material was possessed of sufficient flexibility for the purpose, it so effectively separated or insulated the portions of the resilient body as to impart to the body the properties of two separate resilient bodies rigidly connected together or each connected to the opposite side of a member, through which the resilient waves from one body could not pass to the other body.

Where the bond between the portions of the resilient body and the connecting reinforcing material was imperfect, destruction of the bond speedily followed application of force to the body, especially when the force was applied intermittently over a period of time.

This objectionable condition was most often encountered in the reinforcement of synthetic rubber due to the difficulty of securing perfect bonding thereof to reinforcing materials in general, and in particular to metallic reinforcing materials. In other cases, the continuous application of force caused the occurrence of objectionable and destructive cold flow. This latter condition resulted even where the adhesion between the reinforcement and the surrounding resilient body was perfect. This destructive cold flow is a prime factor in the destruction of resilient sleeves or rubbers of mechanical oil packers.

Due to the fact that the packer sleeves are subjected, in use, to substantially continuous compression, I have provided a reinforcement in the packing body of rubber, synthetic rubber, or rubber coated with synthetic rubber for the purpose explained above, which reinforcement is flexible though inextensible beyond a predetermined degree in one direction. The metallic mesh is provided with interstices, through which, when the mesh is imbedded in rubber, sufficient rubber extends from one side of the mesh to the other side thereof to resiliently join the rubber at opposite sides of the mesh, and by means of which extension of rubber through the mesh, resilient waves, transmitted to one portion of the rubber by the application of force thereto, will be transmitted, through the reinforcing mesh, to the rubber at the opposite sides of the mesh. The application of this mesh greatly strengthens the surface portions of the rubber body against cold flow and, because of the flexibility of the mesh, the resiliency of the rubber body is preserved without the exertion thereon by the mesh of cutting action during the distortion of the rubber.

By reinforcing the resilient body of the packer sleeve by the incorporation therein of flexible mesh provided with interstices or apertures capable of permitting the extension therethrough of sufficient resilient body material from one side of the mesh to the other side thereof, I achieve satisfactory reinforcement of the resilient body material against cold flow under compression without impairment of the resiliency thereof, even though the bond between the resilient body material and the reinforcement be imperfect. Likewise, the longitudinal inextensibility of the flexible mesh imparts additional strength in tension without impairment of the flexibility of the resilient body material.

Referring to the drawing in detail, the resilient cylinder or sleeve 1 is supported on a metal packer body, generally designated 2, which is provided at its top end with a threaded connection 3 and at its bottom end with a threaded connection 4, to which the ends of the well casing or tubing are adapted to be secured. The packer body illustrated is of the casing anchor type and is provided with conical metal sleeves adapted to expand the sleeve 1, but which are normally prevented from so acting by means of copper rivets extending through the sleeves to secure them in position until, under the weight of the casing or tubing above the packer and connected to the threaded connection 3 thereof, the rivets are sheared whereby to allow the conical metal sleeves to expand the resilient sleeve or cylinder 1 against the pipe or walls of the well or cause the packer to set.

As will, of course, be understood, the weight of the tubing or casing above the packer body is substantial and the pressure exerted thereby through the metal sleeves upon the resilient sleeve or cylinder 1 is substantial. As shown in Figures 2, 3 and 4, the resilient sleeve or cylinder 1 is formed of rubber 5 having therein a reinforcement member of flexible metal mesh 6. The flexible metal mesh is preferably incorporated in the rubber 5 before the cylinder 1 is vulcanized.

In Figure 5 is illustrated a construction of sleeve which is broadly similar to that of Figures 2, 3 and 4, but to the outside of which cylinder is applied a coating 7 of oil resistant, resilient material such, preferably, as synthetic rubber. Synthetic rubber is chosen because, in addition to possessing resiliency substantially equivalent to rubber, it is highly resistant to attack of oils, gases and the like, to which rubber is extremely vulnerable. The provision of such a coating of synthetic rubber 7 substantially increases the life of the packer sleeve by providing an oil resistant outer covering therefor. The coating 7 may be applied to the rubber 5 before vulcanization and incorporated therewith into an integral mesh reinforced cylinder of rubber and synthetic rubber, or the coating of synthetic rubber 7 may be applied after vulcanization by means of a brush, by means of a spray, or by means of dipping.

In Figure 6 is illustrated a modified construction wherein the cylinder 1 is provided with a central cylindrical body of rubber 5 reinforced with metal mesh 6, as above described, which is provided with an integral inner cylindrical coating of synthetic rubber 7 and also an outside coating of synthetic rubber 7.

In Figure 7, the resilient cylinder 1 is provided with a central cylindrical body of rubber 5 reinforced with metal mesh 6, which central cylindrical metal mesh reinforced body is coated with synthetic rubber 7 on all surfaces. The above practice of providing coatings of synthetic rubber 7, as illustrated in Figures 5, 6 and 7, is preferable where it is desired to achieve, as nearly as possible, the desirable resistance to oil, of synthetic rubber without its exorbitant cost.

Where cost is not important, it is contemplated that the cylinder 1 be formed entirely of synthetic rubber 7 and reinforced by means of flexible metal mesh 6, as illustrated in Figure 8. Likewise, the synthetic rubber coatings of Figures 5, 6 and 7 may be applied to the rubber 5 before vulcanization, or they may be applied thereafter by means of a brush or spray or by dipping. It is likewise to be understood that, in reinforcing synthetic rubber with the metal mesh, the mesh may be impregnated with rubber and incorporated in the synthetic rubber and thereafter vulcanized therewith, which is a practice which is particularly desirable in the reinforcing of "Glyptal resins". Glyptals are resins of the alkyd type and the name is applied in the art to these resins and particularly to synthetic resins of glycerol phthalate type.

As shown in Figures 9 to 13 inclusive, a preferable form of mesh comprises a plurality of transverse sinuous strands 8 interengaged or interwoven as illustrated in Figure 10 to form a mesh which is flexible within the plane of the mesh and also freely flexible about transverse axes. The free pivoting about transverse axes is due to the transverse disposition of the strands 8, and the flexibility of the mesh in its plane is due to the fact that interengaging portions of the respective strands have arcuate surfaces or areas of contact. As shown in Figures 11, 12 and 13, the respective adjacent strands are designated 8, 8a, 8b, 8c and 8d in the interest of clearness. The mesh is preferably so disposed with respect to the resilient cylinder 1 that the strands 8 extend longitudinally with respect thereto.

Furthermore, when the mesh is incorporated in the rubber, it is preferably partially collapsed so that the respective adjacent strands 8 are closer to one another than as shown in Figure 10, which figure illustrates the position of two adjacent strands when the mesh is extended so far as is possible. The mesh is inextensible with respect to its longitudinal axis due to the fact that the respective adjacent strands are limited from moving away from one another upon their engagement, as illustrated in Figure 10. A cylindrical reinforcement formed with the longitudinal axis of the mesh extending peripherally will be possessed of substantial expansibility and, due to the extension of the rubber or synthetic rubber from opposite sides of the body 5 or the body 7 with respect to the mesh 6 incorporated therein, this expansibility will be resiliently resisted by the rubber or synthetic rubber disposed in the interstices between the respective adjacent strands 8.

As described above, the provision of the reinforcement substantially increases the strength of the rubber of synthetic rubber without impairment of the resiliency thereof. Therefore, a resilient cylinder or sleeve 1 formed according to the principles of this invention will sustain the continuous pressure exerted thereon by the weight of the casing for a long period of time without the occurrence of cold flow and resultant loss of resiliency or "nerve". Furthermore, due to the provision of the coatings of synthetic rubber 7 in the constructions illustrated in Figures 5, 6 and 7, the rubber interior or body of the cylinder is protected from the attack of oils, gases and other various materials, to the attack of which rubber is extremely vulnerable.

It is essential in the practice of the principles of my invention that the reinforcing members used for the reinforcement of the rubber or synthetic rubber body of the cylinder be provided with suitable interstices to permit of the extension of the body material therethrough in order to provide resilient connection between the portions of the body material at the opposite sides of the reinforcement.

By the use of the term "mesh", I comprehend any associated metallic reinforcements, such as wires and foraminous plates and materials other than metal possessed of these properties. In the formation of the mesh reinforced resilient cylinders or sleeves, the mesh, partially collapsed, as pointed out above, is preferably suspended within the mould and the rubber or rubber equivalent (such as synthetic rubber) is placed in the mould and vulcanized into finished form with the metal mesh incorporated therein. Where used, the coating or coatings of synthetic rubber 7 may be applied to the bodies of rubber by dipping, brushing or spraying, either before or after vulcanization, depending upon the particular properties of the synthetic rubber or other suitable rubber equivalent utilized for providing an oil resistant coating for the rubber body.

While the above description and illustration relate to the incorporation in the body of the resilient cylinder or sleeve 1 of a cylindrical reinforcing layer having a single thickness, it is, of course, to be understood that the reinforcement may take the form of a plurality of plies of metal mesh, helically wound, or a plurality of concentrically arranged cylinders of metal mesh.

It will, of course, be understood that the above description is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. A new article of manufacture for use with an oil packer comprising a cylindrical sleeve of resilient synthetic rubber material having incorporated therein a reinforcement comprising flexible articulated metal mesh.

2. A new article of manufacture for use with an oil packer comprising a cylindrical sleeve of resilient rubber having incorporated therein a reinforcement comprising flexible articulated metal mesh having interstices filled with sufficient rubber to provide resilient connection between the portions of the rubber at opposite sides of the mesh.

3. A new article of manufacture for use with an oil packer comprising a cylindrical sleeve of resilient rubber having incorporated therein a reinforcement comprising flexible articulated metal mesh having interstices filled with sufficient rubber to provide resilient connection between the portions of the rubber at opposite sides of the mesh, and an exterior coating of resilient oil resistant material on the exterior of said cylindrical sleeve.

4. A new article of manufacture for use with an oil packer comprising a cylindrical sleeve of resilient rubber having incorporated therein a reinforcement comprising flexible articulated metal mesh, and a coating of oil resistant resilient synthetic rubber material providing a protective covering on the exterior of said resilient sleeve.

5. A resilient sleeve for an oil packer comprising a cylindrical rubber body having incorporated therein a reinforcing member comprising flexible articulated metal mesh.

6. A resilient sleeve for a mechanical oil packer comprising a cylindrical body of synthetic rubber having incorporated therein a reinforcing member of flexible articulated mesh.

ABRAHAM L. FREEDLANDER.